US012219928B1

(12) United States Patent
Liu

(10) Patent No.: US 12,219,928 B1
(45) Date of Patent: Feb. 11, 2025

(54) SMART CAT TEASING UNICYCLE

(71) Applicant: Shenzhen LEPLE Technology Co., Ltd., Guangdong (CN)

(72) Inventor: Zhiping Liu, Guangdong (CN)

(73) Assignee: Shenzhen LEPLE Technology Co., Ltd., Shenzhen (CN)

( * ) Notice: Subject to any disclaimer, the term of this patent is extended or adjusted under 35 U.S.C. 154(b) by 0 days.

(21) Appl. No.: 18/809,111

(22) Filed: Aug. 19, 2024

(51) Int. Cl.
*A01K 15/02* (2006.01)

(52) U.S. Cl.
CPC .................. *A01K 15/025* (2013.01)

(58) Field of Classification Search
CPC .... A01K 15/025; A01K 15/02; A01K 15/027; A63H 33/005; A63H 15/06; B25J 9/0003; B25J 11/00; B25J 9/126; B62D 57/00; B62D 61/00
USPC .................. 119/702, 707; 446/409, 233, 396
See application file for complete search history.

(56) References Cited

U.S. PATENT DOCUMENTS

2024/0310855 A1* 9/2024 Jung ...................... G05D 1/648

FOREIGN PATENT DOCUMENTS

CN 109015667 B * 5/2022 ............. B25J 11/00

* cited by examiner

*Primary Examiner* — Jeffrey R Larsen
(74) *Attorney, Agent, or Firm* — JEEN IP LAW, LLC

(57) ABSTRACT

This application discloses smart cat teasing unicycle, which at least includes a spherical body, a drive assembly, and an annular part. The spherical body is situated within the annular part and contains an installation space. The drive assembly is mounted on the spherical body and is located within the installation space, featuring a rotating shaft. The annular part has two contact ends with the spherical body. One contact end of the annular part is rotatably connected to the spherical body, while the other contact end is drivingly connected to the rotating shaft. The line connecting the two contact ends coincides with the axis of the rotating shaft, and this line passes through the center of the spherical body. This application can enhance the duration and interest of pet playtime.

11 Claims, 7 Drawing Sheets

SMART CAT TEASING UNICYCLE

TECHNICAL FIELD

This application relates to the field of pet toys, particularly to smart cat teasing unicycle.

BACKGROUND OF THE PRESENT INVENTION

With the continuous improvement of people's living standards, keeping pets has become a trend among modern people. Keeping pets necessitates playing with them, which has led to the emergence of a large number of Pet Toys in the market.

There are many toy cars for pets to play with on the market. These toy cars are generally divided into two types: one is non-driven, pushed by the pet itself. This type of toy car has a simple structure but does not attract pets enough, so pets are not keen to use it. The other type is remote-controlled toy cars, which require manual operation through a remote control and must be operated by someone present, which is time-consuming and labor-intensive. Moreover, both types of pet toy cars are prone to tipping over, and once the toy car tips over, pets lose interest in playing with it.

SUMMARY OF PRESENT INVENTION

The objective of this application is to offer smart cat teasing unicycle, enhancing the duration and engagement of pets in play.

To achieve the above objectives, this application provides smart cat teasing unicycle, which at least includes a spherical body, a drive assembly, and an annular part. The spherical body is located within the annular part and has an installation space inside. The drive assembly is installed on the spherical body and is located within the installation space, with the drive assembly having a rotating shaft. The annular part has two contact ends with the spherical body. One contact end of the annular part is rotatably connected to the spherical body, while the other contact end is drivingly connected to the rotating shaft. The line connecting the two contact ends coincides with the axis of the rotating shaft, and this line passes through the center of the sphere of the spherical body.

Preferably, smart cat teasing unicycle also includes a soft rubber sleeve. The soft rubber sleeve is fitted on the outer surface of the spherical body, and its outer surface is adorned with several protrusions.

Preferably, smart cat teasing unicycle also includes a sound device, which is located within the installation space.

Preferably, smart cat teasing unicycle also includes a Sensing Component, a Power Component, and a Controller; the Controller is electrically connected to the Sensing Component, the Drive Assembly, the Sound Device, and the Power Component, respectively. The Power Component provides power to the Controller, the Sensing Component, the Drive Assembly, and the Sound Device.

Preferably, the Drive Assembly also includes a Drive Motor and a Gear Set; the Drive Motor is fixed on the spherical body, and the Drive Motor is connected to the Rotating Shaft through the Gear Set to increase the rotational speed of the Rotating Shaft.

Preferably, the spherical body at least comprises a left hemisphere cover, a right hemisphere cover, and a mounting plate. The left hemisphere cover and the right hemisphere cover are respectively connected to both sides of the mounting plate, and the left hemisphere cover and the right hemisphere cover are oppositely arranged to form a spherical structure.

Preferably, a through hole is provided on the right hemisphere cover; the rotating shaft passes through the through hole and is drivingly connected to the annular part.

Preferably, the power component and the drive motor are positioned on one side of the mounting plate, while the gear set and the rotating shaft are situated on the opposite side; the drive shaft of the drive motor passes through the mounting plate and is drivingly connected to the gear set, and the rotating shaft is rotatably mounted on the mounting plate.

Preferably, the Annular Part is equipped with connection holes, which are used to connect decorative elements to increase the pet's interest in playing.

Preferably, the annular part is equipped with four limit blocks; two of these limit blocks and the other two rotating shafts are symmetrically arranged about the axis of the rotating shaft, and the line connecting the two limit blocks on the same side of the axis of the rotating shaft is parallel to the axis.

Thus, the technical solution provided by this application shows that smart cat teasing unicycle can be composed of a spherical body, a drive assembly, and an Annular Part. The drive assembly is set inside the spherical body, which is located within the Annular Part. One end of the spherical body is rotatably connected to the Annular Part, while the other end is connected to the Annular Part through the drive assembly. Therefore, when smart cat teasing unicycle is placed on the ground for use, the drive assembly drives the Annular Part to contact the ground, causing the spherical body to rotate relative to the ground. This forms the Unicycle Movement Structure, which can prevent the toy from tipping over during movement, thereby increasing the pet's playtime.

At the same time, since one end of the spherical body in this application is rotatably connected to the Annular Part, and the other end of the spherical body is drivenly connected to the Annular Part through the drive assembly, the Annular Part can provide support and balance to the spherical body. This allows the spherical body to continuously output power in the same direction, resulting in faster movement and increasing the fun for the pet.

Furthermore, the spherical body is located inside the Annular Part, and the line connecting the two contact ends of the spherical body and the Annular Part coincides with the axis of the Rotating Shaft, and this line passes through the center of the sphere of the spherical body. Thus, when smart cat teasing unicycle needs to move in the reverse direction, the Annular Part can contact the ground more quickly, making smart cat teasing unicycle's direction change response faster, while also avoiding the issue of the Annular Part startling the pet due to excessive flipping angles during direction changes.

BRIEF DESCRIPTION OF THE DRAWINGS

To more clearly explain the technical solutions in the embodiments of this application, a brief introduction to the accompanying drawings used in the description of the embodiments is provided below. Obviously, the accompanying drawings described below are merely some embodiments of this application. For an ordinary skilled person in the art, other drawings can also be obtained based on these drawings without creative effort.

Figure 1:
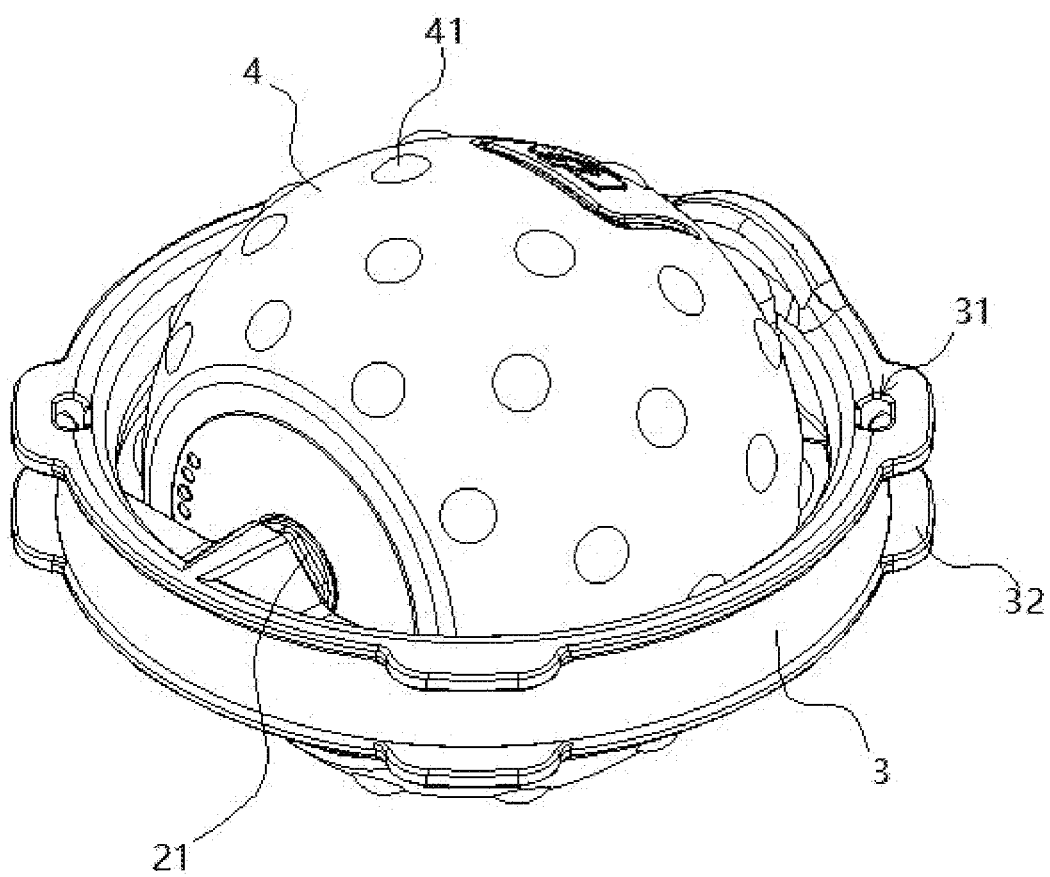
FIG. 1 is a first angle schematic diagram of smart cat teasing unicycle in an embodiment provided by this application.

In the figures: 1, Spherical Body; 11, Installation Space; 12, Left Hemisphere Cover; 13, Right Hemisphere Cover; 131, Through Hole; 14, Mounting Plate; 2, Drive Assembly; 21, Rotating Shaft; 22, Drive Motor; 23, Gear Set; 3, Annular Part; 31, Connection Holes; 32, Limit Block; 4, Soft Rubber Sleeve; 41, Protruding Part; 5, Sound Device; 6, Power Component; 7, Controller.

DETAILED DESCRIPTION OF THE EMBODIMENT'S

To elucidate the objectives, technical solutions, and advantages of this application more clearly, the following will provide a further detailed description of the embodiments of this application in conjunction with the accompanying drawings. The terms used in this application, such as "upper," "above," "lower," "below," "first end," "second end," "one end," "the other end," etc., which indicate spatial relative positions, are employed for the purpose of describing the relationship of one unit or feature relative to another unit or feature as depicted in the accompanying drawings. The terms indicating spatial relative positions are intended to encompass different orientations of the device in use or operation other than the orientation shown in the drawings. For instance, if the device in the drawings is turned upside down, the unit described as being "below" or "under" another unit or feature will be "above" the other unit or feature. Therefore, the exemplary term "below" can encompass both above and below orientations. The device can be oriented in other ways (rotated 90 degrees or other directions), and the spatial-related descriptive terms used herein should be interpreted accordingly.

Furthermore, the terms "installation," "setup," "provided with," "connection," "sliding connection," "fixed," and "sleeve joint" should be interpreted broadly. For instance, "connection" can refer to a fixed connection, a detachable connection, or an integral structure; it can be a mechanical or electrical connection; it can be a direct connection, an indirect connection through an intermediate medium, or an internal communication between two devices, components, or parts. A person of ordinary skill in the art can understand the specific meanings of these terms in this application based on the specific context.

There are many toy cars for pets to play with on the market, generally divided into two types: one is non-driven, pushed by the pet itself. This type of toy car has a simple structure but lacks enough attraction for pets, making them reluctant to use it; the other type is remote-controlled toy cars, which require human operation through a remote control, necessitating someone's presence during use, which is time-consuming and labor-intensive. Moreover, both types of pet toy cars are prone to tipping over, and once the toy car tips over, pets lose interest in playing with it. Based on these issues, there is an urgent need for smart cat teasing unicycle that can prevent the toy car from tipping over during operation, thereby increasing the pet's continuous playtime.

The technical solutions presented in the embodiments of this application will be clearly and comprehensively described below in conjunction with the accompanying drawings. Evidently, the embodiments described herein represent only a portion of the possible embodiments, not the entirety. Based on the embodiments in this application, all other embodiments derived by those skilled in the art without creative efforts fall within the scope of protection of this application.

Figure 2:
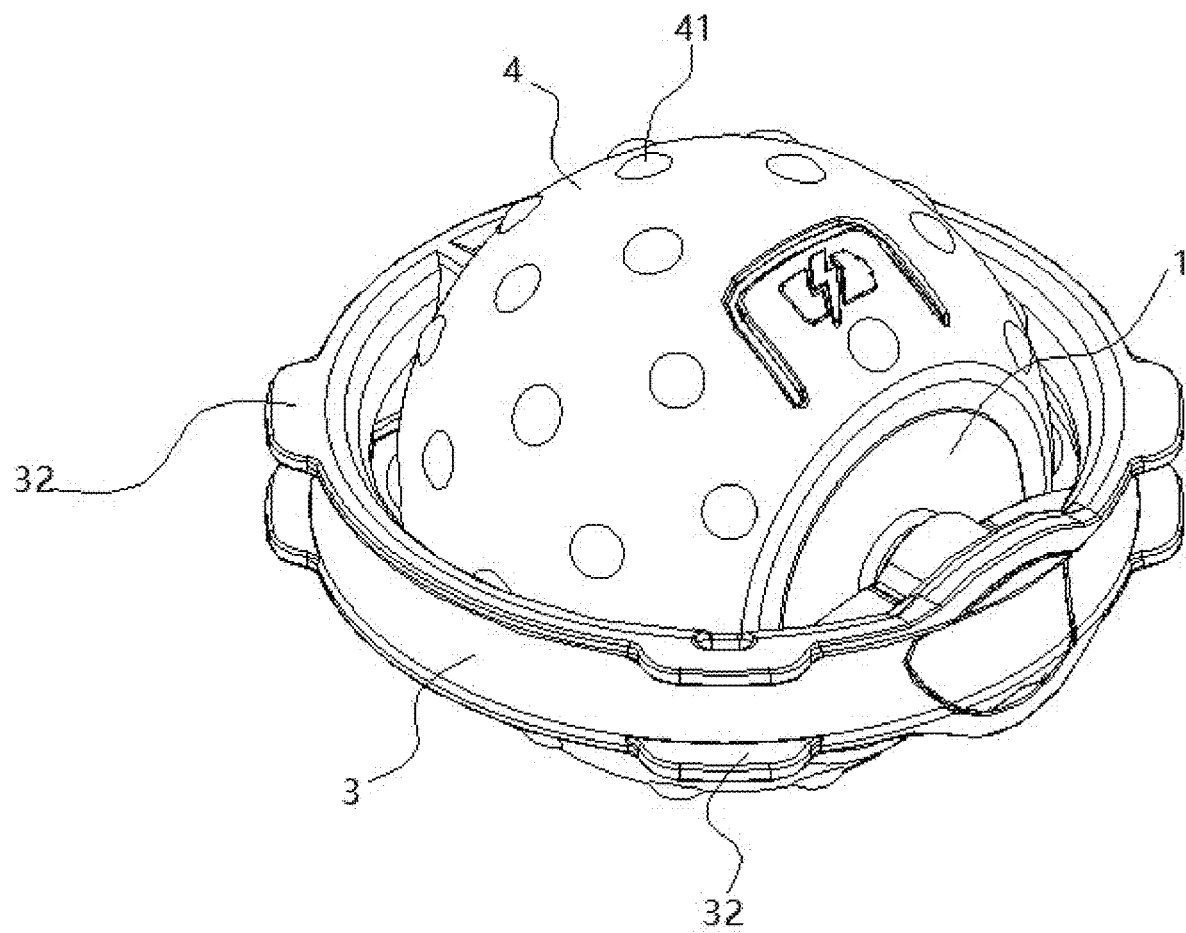
FIG. 2 is a second angle schematic diagram of smart cat teasing unicycle in an embodiment provided by this application.
Figure 3:
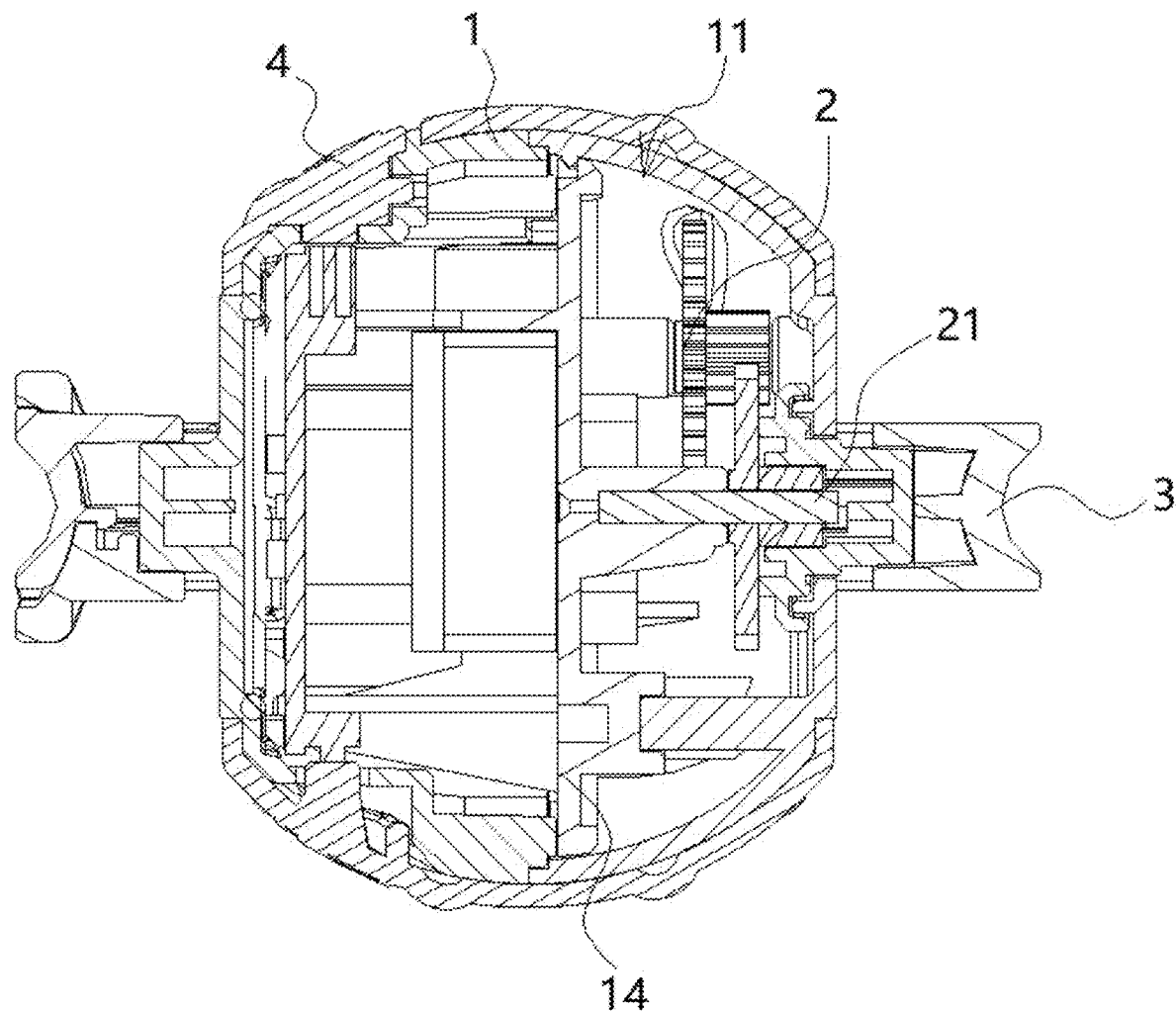
FIG. 3 is a semi-sectional structural schematic diagram of smart cat teasing unicycle in an embodiment provided by this application.

In a feasible embodiment, as illustrated in FIGS. 1 to 3, smart cat teasing unicycle may comprise at least a Spherical Body 1, a Drive Assembly 2, and an Annular Member 3. The Spherical Body 1 is situated within the Annular Member 3 and contains an Installation Space 11. The Drive Assembly 2 is mounted on the Spherical Body 1 and resides within the Installation Space 11, featuring a Shaft 21. Concurrently, the Annular Member 3 has two contact points with the Spherical Body 1: one end of the Annular Member 3 is rotatably connected to the Spherical Body 1, while the other end is drivingly connected to the Shaft 21. The line connecting these two contact points aligns with the axis of the Shaft 21 and traverses the center of the Spherical Body 1.

In this embodiment, the cross-sectional shape of the annular member 3 can be circular, quadrilateral, pentagonal, hexagonal, etc., and this application does not specifically limit it. However, to avoid the situation where the annular member 3 with a polygonal structure causes injury to the pet during movement, this application preferably uses a circular ring member with a circular cross-section. Correspondingly, the center of the sphere of the spherical body 1 can also coincide with the center of the circle of the annular member 3. This allows the annular member 3 to have half on each side of the shaft 21, making the contact time with the ground similar during the forward and reverse rotation of the shaft 21, resulting in more stable operation.

Figure 7:
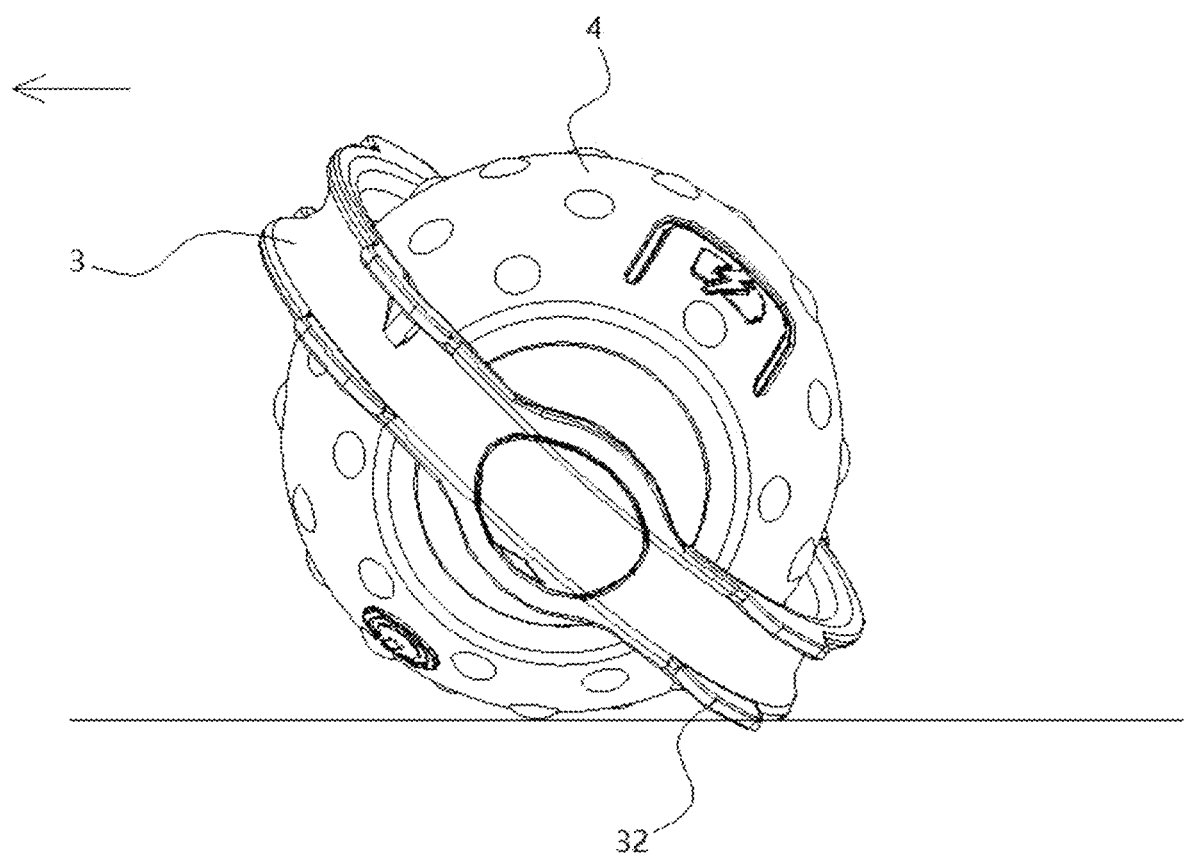
FIG. 7 is a usage state schematic diagram of smart cat teasing unicycle in an embodiment provided by this application.

In practical application, as illustrated in FIG. 7, smart cat teasing unicycle of this invention can be placed on the ground. Since the drive assembly 2 is mounted on the spherical body 1, and the shaft 21 of the drive assembly 2 is drivingly connected to the annular member 3, when smart cat teasing unicycle needs to move, the drive assembly 2 will drive the annular member 3 to flip until it contacts the ground. The ground obstructs the annular member 3 from continuing to flip, thereby reacting on the spherical body 1, causing the spherical body 1 to rotate relative to the ground, thus achieving the movement effect.

At the same time, one end of the aforementioned Spherical Body 1 is rotatably connected to the Annular Member 3, while the other end of Spherical Body 1 is connected to the Annular Member 3 through the Driving Component 2. The Annular Member 3 can provide support and balance to the Spherical Body 1, allowing the Spherical Body 1 to continuously output power in the same direction, thereby increasing the movement speed and enhancing the fun for the pet. Since the Spherical Body 1 is located inside the Annular Member 3, and the line connecting the two contact ends of the Spherical Body 1 and the Annular Member 3 coincides with the axis of the Shaft 21, and this line passes through the center of the sphere of the Spherical Body 1. Thus, when smart cat teasing unicycle needs to move in the reverse direction, the Annular Member 3 can more quickly contact the ground, making smart cat teasing unicycle's direction change response faster, while also preventing the Annular Member 3 from causing disturbance to the pet due to excessive flipping angles during the reverse movement of smart cat teasing unicycle.

Furthermore, to enhance the grip of smart cat teasing unicycle and reduce noise during movement, in one feasible embodiment, please refer again to FIG. 1 and FIG. 2. smart cat teasing unicycle can also include a soft rubber sleeve (4), where the soft rubber sleeve (4) is fitted on the outer surface of the spherical body (1). Naturally, the soft rubber sleeve (4) can also be adhered to the outer surface of the spherical body (1) using adhesive methods. This application does not specifically limit the connection method between the soft rubber sleeve (4) and the spherical body (1).

Furthermore, the outer surface of the Soft Rubber Sleeve 4 is adorned with several Protruding Parts 41. These Protruding Parts 41 can be arranged in either a regular or irregular pattern on the outer surface of the Soft Rubber Sleeve 4. This design ensures that when smart cat teasing unicycle moves, its movements become more dynamic, thereby increasing its appeal to pets.

To enhance the interest of pets in playing, in one feasible embodiment, smart cat teasing unicycle also includes a Sound Device 5, which is located within the Installation Space 11. The Sound Device 5 can attract pets to play by emitting sounds.

Smart cat teasing unicycle can also include a sensing component, power component 6, and controller 7. Controller 7 is electrically connected to the sensing component, driving component 2, sound emitter 5, and power component 6. The controller can receive signals from the sensing component to control the sound emitter 5 and power component 6. Power component 6 provides power to controller 7, the sensing component, driving component 2, and sound emitter 5.

The sensing component can utilize an infrared sensor or a vibration sensor. The infrared sensor can monitor whether the pet is approaching, or the vibration sensor can detect whether the pet is touching smart cat teasing unicycle.

For example, when the Infrared Sensor detects the pet approaching, it can send a signal to Controller 7. Controller 7 then controls the Driving Component 2 and/or Sound Emitter 5 to attract the pet to play. If the Infrared Sensor does not detect the pet approaching for a long time (e.g., within one minute), it can control the Driving Component 2 and/or Sound Emitter 5 to turn off to save power. Of course, it can also be set to start smart cat teasing unicycle at regular intervals for play.

In practical applications, the aforementioned Controller 7 can utilize an MCU as the control chip. The Sound Emitter 5 can employ a speaker or player.

Figure 4:
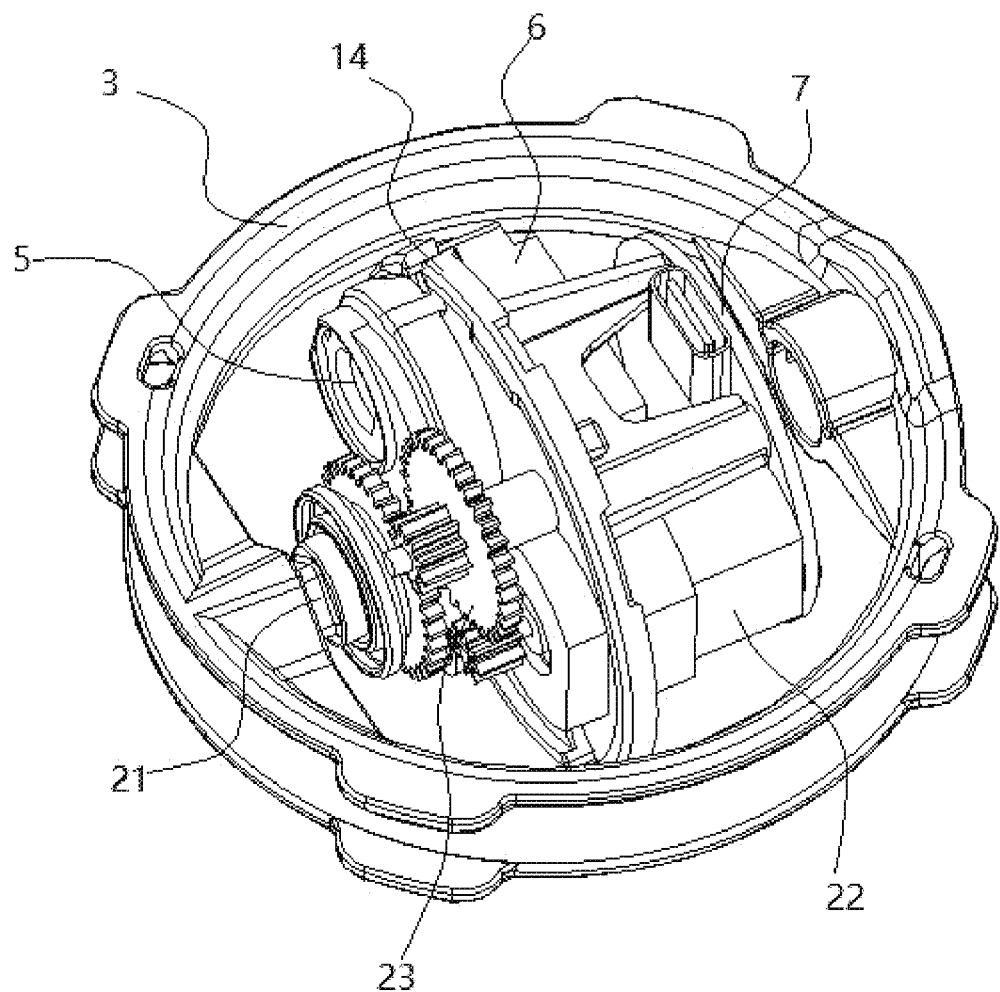
FIG. 4 is a structural schematic diagram after removing the spherical body in FIG. 3.

Regarding the specific structure of the Driving Component 2 mentioned above, in an implementable embodiment, please refer to FIG. 4. The Driving Component 2 also includes a drive motor 22 and a gear set 23. The drive motor 22 is fixed on the spherical body 1, and the drive motor 22 is connected to the shaft 21 through the gear set 23, thereby increasing the rotational speed of the shaft 21.

Of course, the driving component 2 can also be driven solely by a motor, and this application does not specifically limit this.

Figure 5:
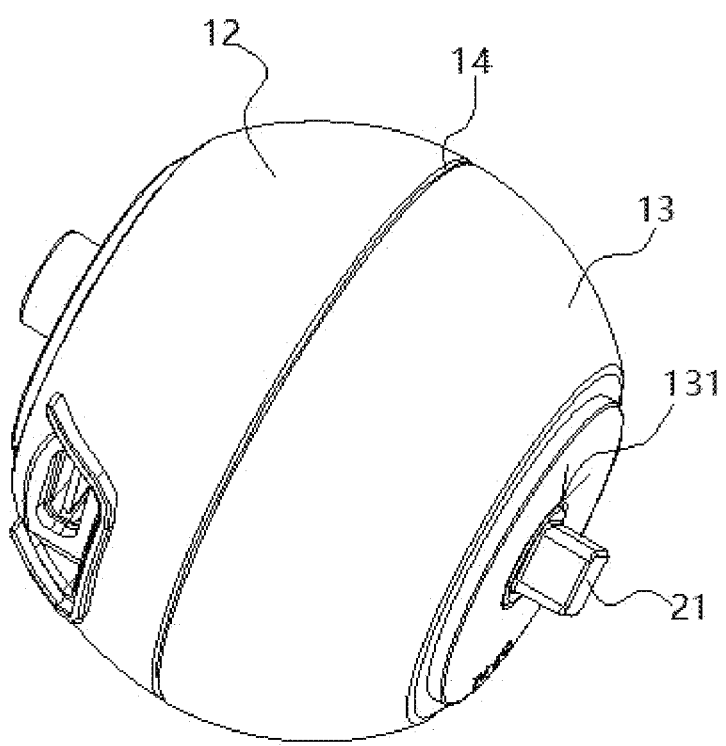
FIG. 5 is a partial structural schematic diagram of smart cat teasing unicycle in an embodiment provided by this application.
Figure 6:
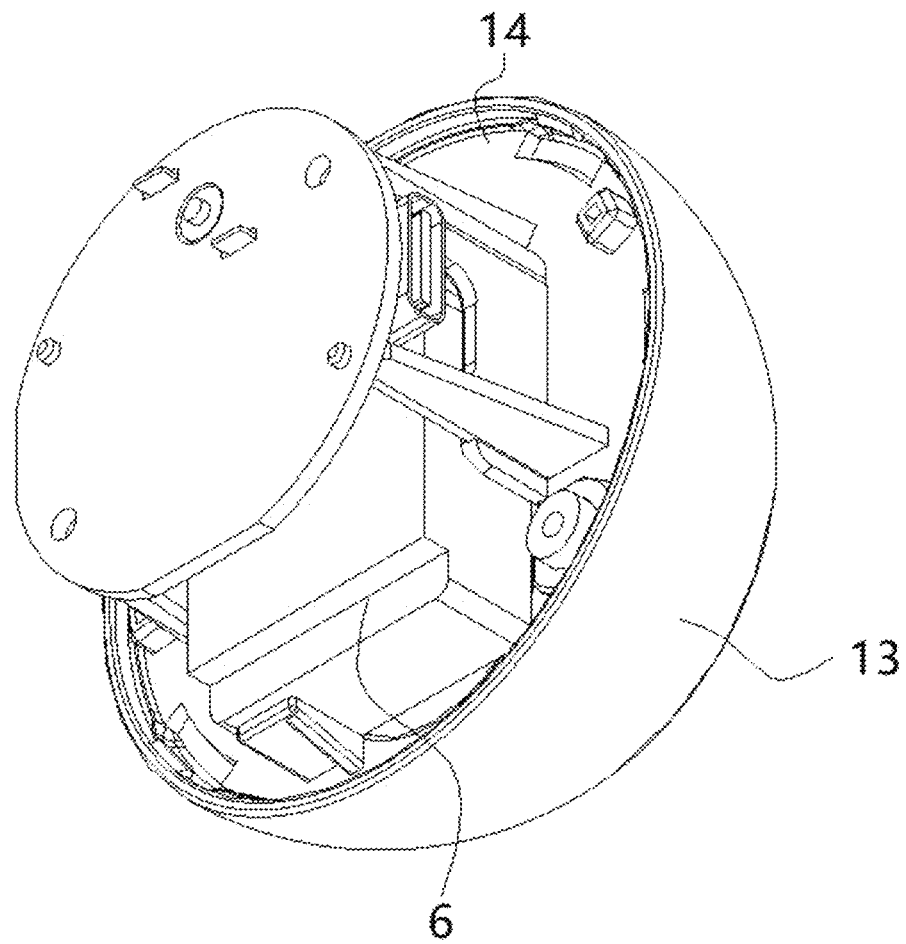
FIG. 6 is a partial structural schematic diagram of FIG. 5.

The Spherical Body 1 can adopt an integrated structure or a split design. Taking the split design as an example, in an implementable embodiment, please refer to FIGS. 5 and 6. The Spherical Body 1 can at least include the Left Hemisphere Cover 12, the Right Hemisphere Cover 13, and the Mounting Plate 14. The Left Hemisphere Cover 12 and the Right Hemisphere Cover 13 are respectively connected to both sides of the Mounting Plate 14, and the Left Hemisphere Cover 12 and the Right Hemisphere Cover 13 are arranged oppositely to form a spherical structure. The internal space of the Left Hemisphere Cover 12 and the Right Hemisphere Cover 13 can form the aforementioned Installation Space 11.

Correspondingly, to enable the driving component 2 located inside the spherical body 1 to be drivingly connected with the annular member 3, a through hole 131 can be provided on the right hemisphere cover 13, through which the shaft 21 passes to be drivingly connected with the annular member 3.

Furthermore, a sealing ring can be set between the shaft 21 and the through hole 131. The sealing ring is used to cover the gap between the shaft 21 and the inner wall of the through hole 131, preventing debris or water from entering the installation space 11.

Simultaneously, to optimally arrange the installation positions within Spherical Body 1, ensuring that the center of gravity is near the middle of Spherical Body 1, Power Component 6 and Drive Motor 22 are positioned on one side of Mounting Plate 14, while Gear Set 23 and Shaft 21 are positioned on the opposite side of Mounting Plate 14. Correspondingly, the drive shaft of Drive Motor 22 passes through Mounting Plate 14 and is drivingly connected to Gear Set 23, with Shaft 21 rotatably mounted on Mounting Plate 14.

Furthermore, Connection Hole 31 is set on Annular Member 3. Connection Hole 31 is used to connect decorative elements to increase the pet's interest in playing. Among these, the decorative elements can be a Rope Buckle Toy or a Cat Teaser Stick that snaps into Connection Hole 31.

To ensure that smart cat teasing unicycle generally moves in a single direction and to prevent it from tipping over, this application also includes four limit blocks (32) on the annular member (3). Two of the limit blocks (32) and the other two shafts (21) are symmetrically arranged about the axis of shaft (21), and the line connecting the two limit blocks (32) on the same side of the axis of shaft (21) is parallel to the axis of shaft (21). Thus, as shown in FIG. 7, when smart cat teasing unicycle moves, two limit blocks (32) are positioned on either side of the contact point between the annular member (3) and the ground, thereby reducing the likelihood of smart cat teasing unicycle experiencing significant yaw to either side.

It can be seen that the technical solution provided by this application allows smart cat teasing unicycle to be composed of a spherical body, a drive assembly, and an annular part. The drive assembly is set up inside the spherical body, which is located within the annular part. One end of the spherical body is rotatably connected to the annular part, while the other end is connected to the annular part through the drive assembly. Thus, when smart cat teasing unicycle is placed on the ground for use, the drive assembly drives the annular part to contact the ground, causing the spherical body to rotate relative to the ground. This forms the Unicycle Movement Structure, preventing the toy from tipping over during movement and extending the pet's playtime.

At the same time, since one end of the spherical body in this application is rotatably connected to the annular part, and the other end is connected to the annular part through the drive assembly, the annular part can provide support and balance to the spherical body. This allows the spherical body to continuously output power in the same direction, resulting in faster movement speed and increasing the fun for the pet during play.

Furthermore, the spherical body is situated within the annular component, and the line connecting the two contact ends of the spherical body and the annular component aligns with the axis of the rotating shaft, passing through the center of the sphere. Thus, when smart cat teasing unicycle needs to reverse, the annular component can contact the ground more swiftly, enhancing the responsiveness of the direction change. This also prevents startling the pet due to excessive flipping angles during direction changes. Additionally, the small-angle flipping of the annular component can prevent the decorative elements wrapped around it from entangling with the annular component and the spherical body, ensuring more stable operation of smart cat teasing unicycle.

Furthermore, the outer surface of the spherical body can be fitted with a soft rubber sleeve, which enhances the ground grip of smart cat teasing unicycle and reduces noise during movement. Additionally, the outer surface of the soft rubber sleeve is adorned with several protrusions, making the movement of smart cat teasing unicycle more dynamic and increasing its appeal for pet play.

Furthermore, by providing connection holes on the Annular Part, decorative elements can be connected through these connection holes to increase the pet's interest in playing. The above description is only a preferred embodiment of this application and is not intended to limit this application. Any modifications, equivalent replacements, improvements, etc., made within the spirit and principles of this application should be included within the scope of protection of this application.

The invention claimed is:

1. Smart cat teasing unicycle, characterized by at least including a spherical body (1), a drive assembly (2), and an Annular Part (3), wherein the spherical body (1) is located within the Annular Part (3) and has an Installation Space (11) inside;
   the drive assembly (2) is installed on the spherical body (1), the drive assembly (2) is located within the installation space (11), and the drive assembly (2) has a rotating shaft (21);
   the annular part (3) has two contact ends with the spherical body (1), the annular part (3) is rotatably connected to the spherical body (1) at one of the contact ends, and the annular part (3) is drivingly connected to the rotating shaft (21) at the other contact end; the line connecting the two contact ends coincides with the axis of the rotating shaft (21), and this line passes through the center of the sphere of the spherical body (1);
   the Annular Part (3) is provided with connection holes (31), which are used to connect decorative elements to increase the pet's interest in playing.

2. Smart cat teasing unicycle according to claim 1, characterized in that smart cat teasing unicycle further includes a Soft Rubber Sleeve (4);
   the Soft Rubber Sleeve (4) is sleeved on the outer surface of the spherical body (1), and the outer surface of the Soft Rubber Sleeve (4) is provided with several Protruding Parts (41) in a scattered arrangement.

3. Smart cat teasing unicycle according to claim 1, characterized in that smart cat teasing unicycle further includes a Sound Device (5), wherein the Sound Device (5) is located within the installation space (11).

4. Smart cat teasing unicycle according to claim 3, characterized in that smart cat teasing unicycle further includes a Sensing Component, a Power Component (6), and a Controller (7);
   the controller (7) is electrically connected to the sensing component, the drive assembly (2), the sound device (5), and the power component (6) respectively; the power component (6) provides power to the controller (7), the sensing component, the drive assembly (2), and the sound device (5) respectively.

5. Smart cat teasing unicycle according to claim 4, characterized in that the drive assembly (2) further includes a drive motor (22) and a gear set (23);
   the drive motor (22) is affixed to the spherical body (1), and the drive motor (22) is connected to the rotating shaft (21) via the gear set (23) to enhance the rotational speed of the rotating shaft (21).

6. Smart cat teasing unicycle according to claim 5, characterized in that the spherical body (1) at least comprises a left hemisphere cover (12), a right hemisphere cover (13), and a mounting plate (14);
   the Left Hemisphere Cover (12) and the Right Hemisphere Cover (13) are respectively affixed to both sides of the Mounting Plate (14), with the Left Hemisphere Cover (12) and the Right Hemisphere Cover (13) positioned opposite each other to form a spherical structure.

7. Smart cat teasing unicycle according to claim 6, characterized in that a through hole (131) is provided on the Right Hemisphere Cover (13);
   the rotating shaft (21) passes through the through hole (131) and is drivingly connected to the annular part (3).

8. Smart cat teasing unicycle according to claim 7, characterized in that the power component (6) and the drive motor (22) are arranged on one side of the mounting plate (14), while the gear set (23) and the rotating shaft (21) are arranged on the other side of the mounting plate (14);
   the drive shaft of the drive motor (22) passes through the mounting plate (14) and is drivingly connected to the gear set (3), while the rotating shaft (21) is rotatably arranged on the mounting plate (14).

9. Smart cat teasing unicycle according to claim 1, characterized in that four limit blocks (32) are provided on the annular part (3); two of the limit blocks (32) and the other two rotating shafts (21) are symmetrically arranged about the axis of the rotating shaft (21), and the line connecting the two limit blocks (32) on the same side of the axis of the rotating shaft (21) is parallel to the axis of the rotating shaft (21).

10. Smart cat teasing unicycle, characterized by at least including a spherical body (1), a drive assembly (2), and an Annular Part (3), wherein the spherical body (1) is located within the Annular Part (3) and has an Installation Space (11) inside;
    the drive assembly (2) is installed on the spherical body (1), the drive assembly (2) is located within the installation space (11), and the drive assembly (2) has a rotating shaft (21);
    the annular part (3) has two contact ends with the spherical body (1), the annular part (3) is rotatably connected to the spherical body (1) at one of the contact ends, and the annular part (3) is drivingly connected to the rotating shaft (21) at the other contact end; the line connecting the two contact ends coincides with the axis of the rotating shaft (21), and this line passes through the center of the sphere of the spherical body (1);

four limit blocks (32) are provided on the annular part (3); two of the limit blocks (32) and the other two rotating shafts (21) are symmetrically arranged about the axis of the rotating shaft (21), and the line connecting the two limit blocks (32) on the same side of the axis of the rotating shaft (21) is parallel to the axis of the rotating shaft (21).

11. Smart cat teasing unicycle, characterized by at least including a spherical body (1), a drive assembly (2), and an Annular Part (3), wherein the spherical body (1) is located within the Annular Part (3) and has an Installation Space (11) inside;

- the drive assembly (2) is installed on the spherical body (1), the drive assembly (2) is located within the installation space (11), and the drive assembly (2) has a rotating shaft (21);
- the annular part (3) has two contact ends with the spherical body (1), the annular part (3) is rotatably connected to the spherical body (1) at one of the contact ends, and the annular part (3) is drivingly connected to the rotating shaft (21) at the other contact end; the line connecting the two contact ends coincides with the axis of the rotating shaft (21), and this line passes through the center of the sphere of the spherical body (1);
- smart cat teasing unicycle further includes a Sound Device (5), wherein the Sound Device (5) is located within the installation space (11);
- smart cat teasing unicycle further includes a Sensing Component, a Power Component (6), and a Controller (7);
- the controller (7) is electrically connected to the sensing component, the drive assembly (2), the sound device (5), and the power component (6) respectively; the power component (6) provides power to the controller (7), the sensing component, the drive assembly (2), and the sound device (5) respectively;
- the drive assembly (2) further includes a drive motor (22) and a gear set (23);
- the drive motor (22) is affixed to the spherical body (1), and the drive motor (22) is connected to the rotating shaft (21) via the gear set (23) to enhance the rotational speed of the rotating shaft (21);
- the spherical body (1) at least comprises a left hemisphere cover (12), a right hemisphere cover (13), and a mounting plate (14);
- the Left Hemisphere Cover (12) and the Right Hemisphere Cover (13) are respectively affixed to both sides of the Mounting Plate (14), with the Left Hemisphere Cover (12) and the Right Hemisphere Cover (13) positioned opposite each other to form a spherical structure;
- a through hole (131) is provided on the Right Hemisphere Cover (13);
- the rotating shaft (21) passes through the through hole (131) and is drivingly connected to the annular part (3);
- the power component (6) and the drive motor (22) are arranged on one side of the mounting plate (14), while the gear set (23) and the rotating shaft (21) are arranged on the other side of the mounting plate (14);
- the drive shaft of the drive motor (22) passes through the mounting plate (14) and is drivingly connected to the gear set (23), while the rotating shaft (21) is rotatably arranged on the mounting plate (14).

\* \* \* \* \*